Figure 6:
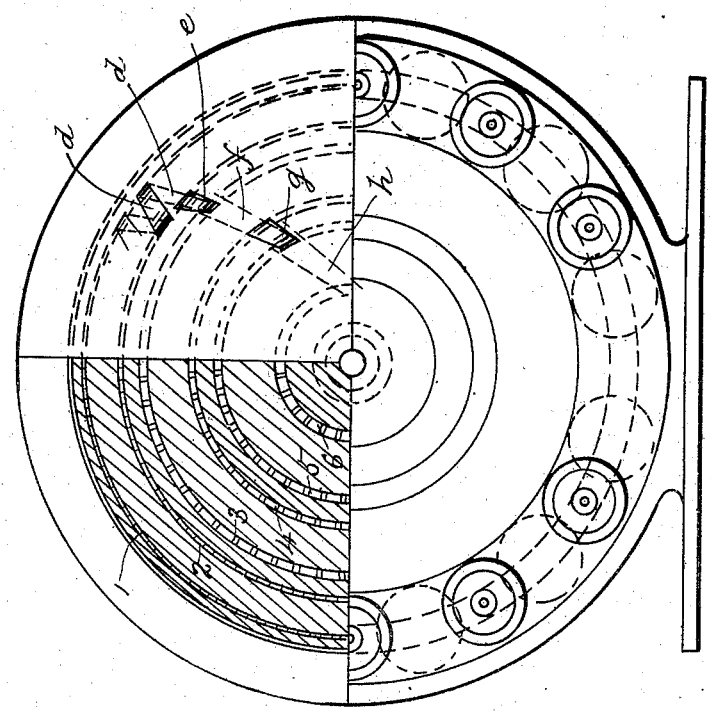

No. 850,397. PATENTED APR. 16, 1907.
H. P. R. L. PÖRSCKE.
ELASTIC FLUID TURBINE.
APPLICATION FILED OCT. 12, 1906.
3 SHEETS—SHEET 1.
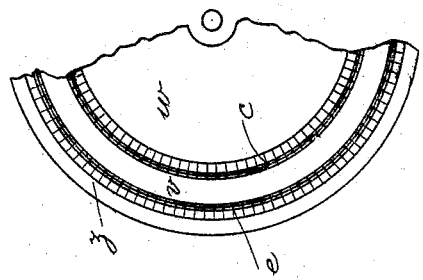
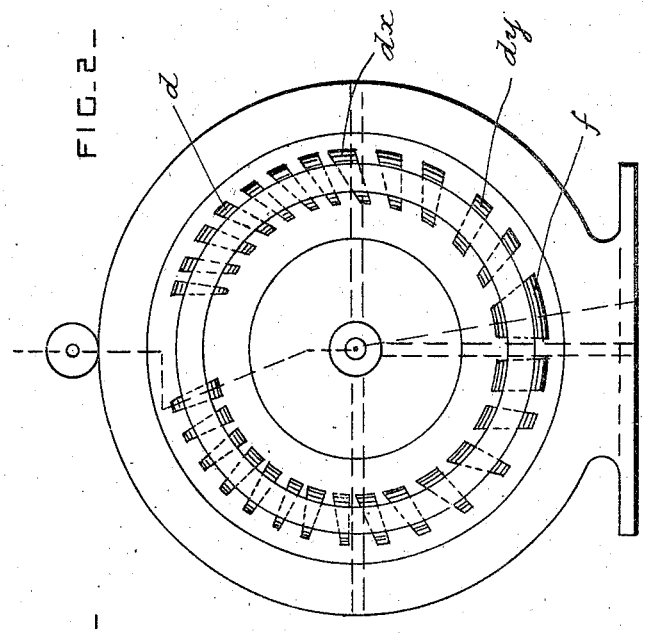
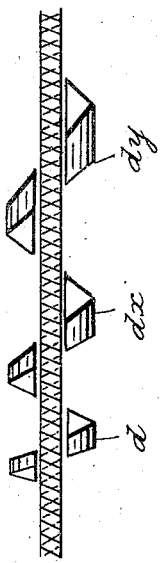
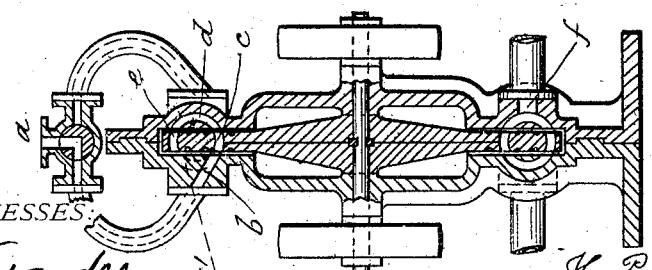
WITNESSES:
Walter Allen
Edwd L. Tolson
INVENTOR
H. P. R. L. Pörscke
BY Herbert W. Jenner
Attorney No. 850,397. PATENTED APR. 16, 1907.
H. P. R. L. PÖRSCKE.
ELASTIC FLUID TURBINE.
APPLICATION FILED OCT. 12, 1906.

3 SHEETS—SHEET 2.

WITNESSES:
Walter Allen
Ewd L. Tolson.

INVENTOR
H. P. R. L. Pörscke
BY Herbert W. Jenner.
Attorney

THE NORRIS PETERS CO., WASHINGTON, D. C.

No. 850,397. PATENTED APR. 16, 1907.
H. P. R. L. PÖRSCKE.
ELASTIC FLUID TURBINE.
APPLICATION FILED OCT. 12, 1906.
3 SHEETS—SHEET 3.
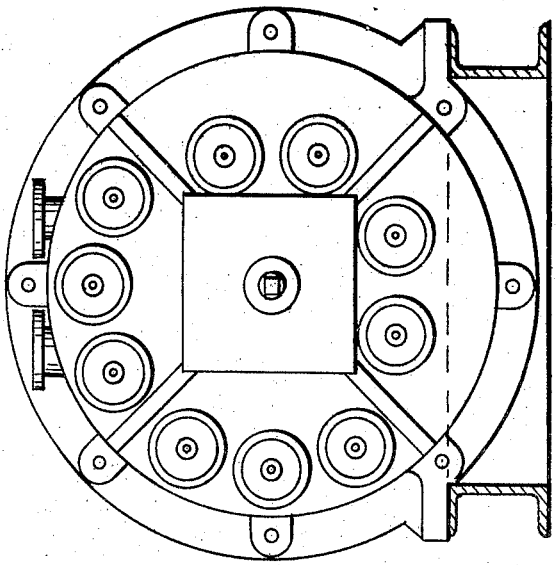
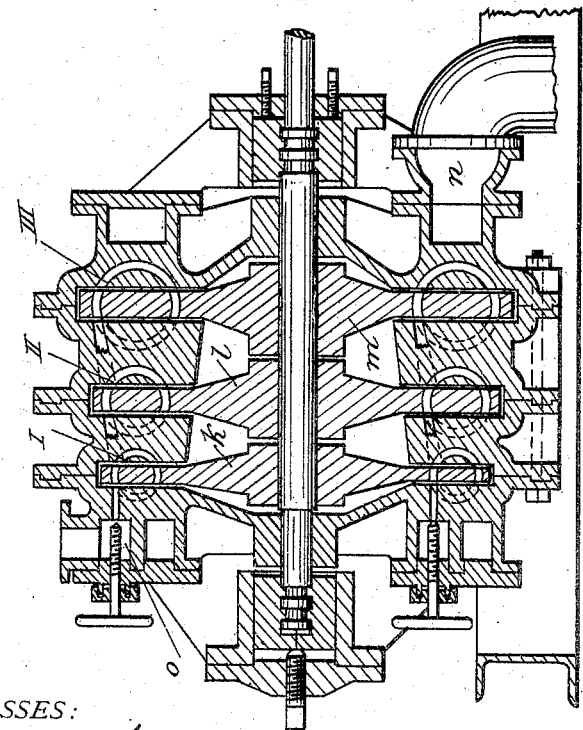
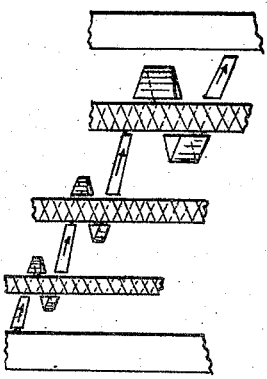
WITNESSES:
INVENTOR
BY
Attorney.

UNITED STATES PATENT OFFICE.

HEINRICH P. RUDOLF L. PÖRSCKE, OF HAMBURG, GERMANY.

ELASTIC-FLUID TURBINE.

No. 850,397.      Specification of Letters Patent.      Patented April 16, 1907.

Application filed October 12, 1906. Serial No. 338,612.

*To all whom it may concern:*

Be it known that I, HEINRICH PAUL RUDOLF LUDWIG PÖRSCKE, a subject of the German Emperor, residing at Hamburg, in Germany, have invented certain new and useful Improvements in Elastic-Fluid Turbines, of which the following is a specification.

This invention relates to improvements in elastic-fluid turbines.

In the steam-turbines of known construction in which the velocity of a steam-jet flowing into the free atmosphere is used in such a manner that high-pressure steam impinges on the vanes of a wheel after being fully expanded and transfers its *vis viva* to said blades to rotate the wheel a high linear velocity of the wheel is conditional upon the high velocity of exhaust. This high linear velocity of the wheel requires either the application of gearing as in the De Laval turbine or the use of wheels of large diameter, as in the Riedler-Stumpf type, in order to attain the useful number of revolutions for practical working. The inconveniences thus arising are very evident in the construction of the De Laval type, the high gearing causing a large portion of the energy to be absorbed by friction, whereas in the Riedler-Stumpf construction the large wheels must be very accurately balanced in order to obviate the dangerous effects of centrifugal force and the losses by friction resulting therefrom. Moreover, the large dimensions and considerable mass which absorbs energy are further disadvantages, and, again, in both constructions the *vis viva* of the steam is not completely utilized. In a number of American and English constructions a better utilization of steam has been attained by passing the steam several times through helical or loop-shaped channels back to the vanes of the wheel. The steam is, however, not used completely, since on entering the turbine the steam-jet, having still a certain tension and a considerable velocity impinging against a few vanes of the wheel, increases in volume on leaving said vanes and is passed back several times to the wheel through helical or loop-shaped channels of equal cross-section and pitch or height. The inconvenience arising therefrom is that the steam-jet which increases in volume during the work is subjected to friction in said channels of equal cross-section, and this is greater the larger the number of channels to be traversed. Throttling of the steam-jet therefore takes place, whereby its velocity is considerably reduced and probably so much so that on the second or third return to the vanes such velocity is already reduced to below that proportional to the peripheral speed of the wheel, and therefore has a braking effect. Even if the channels are made of such large cross-section that the steam-jet at first occupies, for instance, only a quarter thereof, so that throttling would eventually be obviated, the velocity of the jet would be reduced, owing to progressive expansion, in such a manner that after a few returns to the vanes the velocity would still be below that required by the peripheral speed of the wheel. Since in the aforesaid constructions a repeated return of the steam-jet to the blades is required for completely utilizing the steam, owing to the shallow pitch of the channels and vanes, these constructions are not successful.

In the construction of turbine according to the present invention all the aforesaid disadvantages are removed. The effect of the steam—viz., its *vis viva*—is completely utilized in spite of repeated returns of the same steam-jet to the vanes without appreciable frictional loss in the channels, this being obtained by causing the steam-jet on entering the vanes to first impinge upon the vanes at a small angle to the axis, (small pitch of the leading channels,) and this angle increases progressively at each further return to the vanes, the pitch of the channels increasing in proportion to the decreasing speed of the steam. Simultaneously with the increasing pitch of the channels at each return of the steam-jet the cross-section of the channels increases in proportion to the pitch and according to the progressive expansion of the steam, so that with the progressive enlargement of the angle of impact a continually-increasing number of wheel-vanes are acted upon. With this repeated effective return of the steam-jet, in which many wheel-vanes are acted upon simultaneously by the steam, the number of revolutions of the turbine-shaft is comparatively small, the wheel is balanced, owing to impact on both sides, and the turbine may be made reversible. A great advantage in comparison with known constructions consists in the fact that during the whole work from inlet to exhaust the steam is completely utilized in spite of the repeated return of the steam-jet to the blades.

Assuming twenty gradations of pressure and velocity, (with ten screw-channels,) the practically expanded steam-jet retarded in its speed still delivers a certain force to the wheel. As from the beginning of the first pressure-degree down to the last gradation— that is to say, the twentieth—a continuous decrease in the number of screw-channels per unit of length, and therefore an increase of the screw pitch takes place, the steam-jet flows at first with small and finally with large angle speed against the vanes. It therefore cannot occur that at the lowest degree of pressure corresponding to the last gradation the steam-jet retarded in its velocity by the preceding delivery force cannot attain the peripheral speed of the wheel. If the angle at which the steam-jet impinges against the vanes with regard to a line parallel to the wheel-axis be, for instance, At impact No. 1 = 15°,
At impact No. 10 = 30°,
At impact No. 20 = 60°, and the absolute speed be, At impact No. 1 = 800 m. per second,
At impact No. 10 = 400 m. per second,
At impact No. 20 = 200 m. per second, the resultant peripheral speeds without regarding loss from bearing friction are as follows:

For impact No. 1—
$$\frac{800-15°}{90°} = 133.3 \text{ m. per second,}$$

For impact No. 10—
$$\frac{400-30°}{90°} = 133.3 \text{ m. per second,}$$

For impact No. 20—
$$\frac{200-60°}{90°} = 133.3 \text{ m. per second.}$$

It will be seen the live-steam jet first entering the turbine at high speed propels the wheel at no greater number of revolutions than the fully-expanded steam-jet at the last gradation of pressure and retarded in its velocity by the previous delivery. At the first impact the wheel is acted upon by a live-steam jet of small volume and small angle to a line parallel to the axis, the vane-surface being large, but number of the vanes acted upon small. At the last impact, however, the wheel is acted upon by a fully-expanded steam-jet of large volume at a large angle to a line parallel to the wheel-axis, the vane-surface being small, but the number of vanes acted upon being large.

Figure 5:
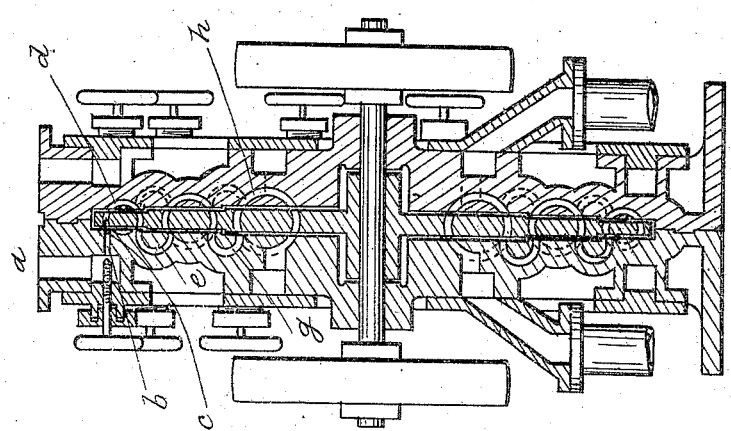

Reference being made to the annexed drawings, Figure 1 is a view, principally in section in the line of the axis, of a form of turbine with one circular helical steam-passage. Fig. 2 is a view of one-half of the casing. Fig. 3 shows part of the wheel. Fig. 4 is a diagram of the helical passage of the vanes and illustrates the increasing pitch and width of the passage. Figs. 5 and 6 illustrate a modified construction in which three concentric circles of helical passages are employed. Fig. 5 is an axial section, and Fig. 6 is a view the lower half of which is a side elevation, the upper left-hand quarter a section of the wheel, and the upper right-hand quarter a diagram in which the course of the steam is illustrated through one passage. Fig. 7 is an axial section, Fig. 8 a side or end view, and Fig. 9 a diagram illustrative of another modification.

In the form of construction illustrated in Figs. 1 to 4 the wheel-casing is completely closed and provided in the interior with channels $d\ d'$, of helical or loop form, which increase in cross-section and pitch at each following convolution, as at $d\ d^x\ d^y$, so that the steam on entering the turbine at $a$ and passing through passage $b$ acts on the wheel—for instance, at $d$—at an angle of fifteen degrees to a line parallel to the axis. At or about the center the pitch of the screw-channels has increased so far that the jet acts on the vane—for example, at $d^x$—at an angle of thirty degrees to a line parallel to the axis, and from the center to the end at $d^y$ the pitch of the screw-channels has continuously increased, so that at the last convolution the jet acts on the vane at an angle of about sixty degrees to a line parallel to the axis. With the continually-increasing pitch of the screw-channels the cross-section of the latter also increases. If said cross-section at the commencement at $d$ is thirty square millimeters, that shortly before the outlet toward $d^y$ would be one hundred and twenty square millimeters. The core of the helical channels is formed by the wheel, which is provided at the top and bottom of the helix with straight vanes $e\ c$ or vanes having opposite inclination at the outer circular group $e$ to those at the inner group $c$. The vanes $c$ form at the same time the connection with the parts $w$ and $v$ of the actual wheel-body, and the upper vane-crown $e$ is surrounded by a closing-ring $z$. The vanes of both groups $e$ and $c$ must therefore be of opposite angle of inclination to each other in order that the steam acts on both sets of vanes in uniform manner to produce rotation. Owing to the helical shape of the guide-channels $d\ d'$, the inner vane group $c$ is acted upon, for instance, from the left, Fig. 1, and the outer group $e$ from the right, whereby the wheel rotates in the casing without axial thrust. The operation of this form of turbine is as follows: The steam enters through a three-way cock $a$, whence it is directed into a pipe—for instance, for forward motion—and acts as a jet of small volume and at a small angle to a line parallel to the axis on the inner group of vanes $c$. After having acted upon one or more vanes, and thus imparted a certain amount of energy in the form of rotation to the wheel, it enters at the opposite side a guide-channel $d$, the inlet of which is enlarged and the outlet narrowed. This guide-channel has already a somewhat increased pitch, so that the jet acts on the outer vane group $e$ at an angle of about seventeen degrees to a line parallel to the axis. The steam-jet then acts at each convolution upon the inner vane group from the left, Fig. 7, and on the upper vane group from the right. From the inlet to the outlet the steam-jet increases in volume and decreases in pressure at each convolution, always acting on more vanes than previously. At the same time the helical passage of the steam progressively increases in pitch.

If the above-described turbine is to be reversible, the steam is directed by operating the three-way cock to communicate with screw-guides $g$ of opposite pitch to those for forward direction. If the impact-angles of the forward guide are regarded as "plus" degrees to the axis, the impact-angles for reversal will be "minus" degrees to the axis, and therefore opposite. The action of the steam-jet is exactly the same as for forward driving with the exception that the wheel rotates in the reverse direction. The steam exhausts at $f$.

Several guide-channels may be arranged in a casing with cross-section increasing at every return and also with increase of impact-angles to a line parallel to the axis for forward driving and also several guide-channels, as aforesaid, for reversing.

In the modification shown in Figs. 5 and 6 three helical channels are shown supported radially above one another, and said channels are intersected through by the wheel, the vane groups of which increase, for instance, in three degrees of width of vanes. In this construction the live steam from $a$ enters a ring-shaped steam-space $b$, whence it passes through orifices controlled by needle-valves to the outermost vane group 1 of the wheel and from the latter through several guide-channels $d$ $d$, which increase in cross-section and pitch at every half-convolution, the steam in its passage acting upon the first and second vane groups 1 and 2 of the wheel. The steam then passes through a transmission-channel $e$, which directs it at a somewhat larger angle to a line parallel to the axis against the third vane group 3. The steam now acts during its helical course through one or more channels $f$ of increasing pitch and cross-section on the third and fourth groups of vanes 3 and 4 and then passes in still larger volume and at a larger angle of pitch through a second transmission-channel $g$ to the fifth group of vanes 5, whereupon it passes through one or more channels $h$ of the largest cross-section and of somewhat greater pitch than the preceding ones and impinges on its way upon the fifth and sixth groups of vanes 5 and 6, finally entering an exhaust channel or chamber. The width of the single groups of vanes increases with their decreasing diameter in order to approximately balance the smaller leverage of the groups of smaller diameter by a larger pressure effect on the single vanes. In this construction the steam-jet of greatest velocity and pressure, but of smallest volume, enters helical channels of smallest cross-section and acts upon the first and second groups of vanes of high rotational speed, but having small vane-surfaces, and delivers a part of its force in the form of rotation. The steam-jet then enters helical guide-channels of larger cross-section in order to allow of the increase of volume of the steam, owing to expansion, then acting on the third and fourth groups of vanes of smaller diameter, but greater width, and delivers a part of its force, and so on.

In the modification shown in Figs. 7 to 9 a plurality of helical guide-channels are supported axially behind each other, each having a separate wheel $k$ $l$ $m$, which, however, are all mounted on a common shaft. The action is here the same as in the construction first described; but the efficiency is greater by the fact that with increase of screw pitch and decrease of steam-pressure the surfaces of the vanes acted upon by the steam-jet considerably increase. This is obtained by causing the diameters of the helical channels to progressively increase, for instance, in three degrees and at the same time successively increasing the width of the wheels which intersect said channels. By these means a vane-surface considerably increasing in three degrees of pressure is offered to the steam-jet, which expands during its work, and at the same time the impact angle progressively increases from the entrance of steam to the exhaust thereof. For forward driving the steam is caused to enter one preliminary steam-chamber $o$ and for backward driving another chamber $p$ and passes from the one or other of said chambers through the helical guide-channels which successively increase in cross-section and pitch. The steam thus acts on the wheels, the vanes of which increase in width from the first wheel $k$ to the last wheel $m$. From said last wheel the steam enters an exhaust-collecting channel or chamber $u$.

What I claim as my invention, and desire to secure by Letters Patent of the United States, is—

1. In a turbine the combination of a casing containing helical passages increasing progressively in pitch and in cross-sectional area, and having their axes disposed in circles about the axis of said casing said casing having also a chamber extending from the axis of the casing and intersecting the said helical passages on two sides in the plane of a diameter thereof, and a wheel journaled axially in said casing extending with said chamber and having vane-crowns where said wheel intersects the helical passages.

2. In a turbine the combination of a casing containing a plurality of helical passages increasing progressively in pitch and in cross-sectional area, and having their axes disposed in circles about the axis of said casing said casing having also a chamber extending from the axis of the casing and intersecting the said helical passages on two sides in the plane of a diameter thereof, a wheel journaled axially in said casing extending with said chamber and having vane-crowns where said wheel intersects the helical passages, and means for controlling the admission of expansive fluid to said passages.

3. In a turbine the combination of a casing containing a plurality of helical passages opposite in helical direction and increasing progressively in pitch and in cross-sectional area, and having their axes disposed in circles about the axis of said casing said casing having also a chamber extending from the axis of the casing and intersecting the said helical passages on two sides in the plane of a diameter thereof, a wheel journaled axially in said casing extending with said chamber and having vane-crowns where said wheel intersects the helical passages, and means for controlling the admission of expansive fluid to said passages respectively.

4. In a turbine the combination of a casing containing a plurality of helical passages increasing progressively in pitch and in cross-sectional area, and having their axes disposed in circles about the axis of said casing said casing having also a chamber extending from the axis of the casing and intersecting the said helical passages on two sides in the plane of a diameter thereof, a wheel journaled axially in said casing extending with said chamber and having a plurality of vane-crowns where said wheel intersects the helical passages, means for passage of the expansive fluid from one helical passage to another in series, and means for controlling the admission of expansive fluid to said passages.

5. In a turbine the combination of a casing containing helical passages increasing progressively in pitch and in cross-sectional area, and having their axes disposed in circles about the axis of said casing said casing having also a chamber extending from the axis of the casing and intersecting the said helical passages on two sides in the plane of a diameter thereof, a wheel journaled axially in said casing extending with said chamber and having vane-crowns where said wheel intersects the helical passages, the vanes of said vane-crowns being obliquely directed to the plane of intersection of the helical passage, those of one crown being oppositely directed to those of the other crown, and means for controlling the admission of expansive fluid to said passages.

6. In a turbine, the combination, with a revoluble wheel having an inner and an outer series of vanes at its periphery, of a casing provided with segmental passages arranged in helical form at the opposite sides of the said wheel and with a progressively-increasing pitch and operating to conduct the motor fluid from the vanes of one series to the vanes of the other series continuously and in a helical path.

In witness whereof I have signed this specification in the presence of two witnesses.

H. P. RUDOLF L. PÖRSCKE.

Witnesses:
SIEGFRIED STORCH,
OTTO W. HELLMRICH.